United States Patent [19]

Elmer

[11] 3,895,163

[45] July 15, 1975

[54] BONDING RUBBER TO GLASS FIBERS
[75] Inventor: Otto C. Elmer, Akron, Ohio
[73] Assignee: The General Tire & Rubber Company, Akron, Ohio
[22] Filed: Oct. 9, 1973
[21] Appl. No.: 404,480

[52] U.S. Cl. ............ 428/295; 156/110 A; 156/331; 156/335; 260/29.3; 260/840; 260/845; 260/846; 428/251; 428/261; 428/268; 428/278; 428/383; 428/392; 428/382; 428/378
[51] Int. Cl.² ........................ B29H 9/06; B29H 9/10
[58] Field of Search ............ 161/143, 144, 170, 175, 161/176, 198, 203; 156/110 A, 110 MD, 331, 335; 260/309.7, 29.3, 840, 845, 846; 57/140 C, 140 G; 117/126 GB

[56] References Cited
UNITED STATES PATENTS

| | | | |
|---|---|---|---|
| 3,518,155 | 6/1970 | Freytag et al. | 156/110 A |
| 3,547,729 | 12/1970 | Kibler | 156/331 |
| 3,567,671 | 3/1971 | Janetos et al. | 117/126 GB |

FOREIGN PATENTS OR APPLICATIONS 1,166,845  10/1969  United Kingdom

Primary Examiner—George F. Lesmes
Assistant Examiner—Charles E. Lipsey

[57] ABSTRACT

An aqueous alkaline dispersion of a rubbery vinyl pyridine copolymer, a polymethylol glycoluril compound, and a resorcinol-formaldehyde novolak, in certain amounts, is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of said adhesive.

22 Claims, No Drawings

BONDING RUBBER TO GLASS FIBERS

OBJECTS

An object of the invention is to provide a composite of a glass fiber reinforcing element adhesively bonded fiber tire a rubber compound, e.g., glass fibertire cords adhesively bonded to provide carcass plies and belt plies for making tires. Another object is to provide glass fiber reinforcing elements, e.g., such as those used in the belt and the carcass plies of tires, with a minor amount of an adhesive so that the adhesive containing elements may subsequently be bonded to rubber on curing. A further object is to provide a method for bonding glass fibers, particularly glass fiber textiles, fibers, cords and so forth, to rubber compounds using a single dip. A still further object is to provide a glass fiber or cord adhesive dip composition. These and other objects and advantages of the present invention will become more apparent to those skilled in the art from the following detailed description and working example.

SUMMARY OF THE INVENTION

According to the present invention it has been discovered that a composition comprising an aqueous alkaline dispersion of 100 parts by weight (dry) of a rubbery vinyl pyridine copolymer, from about 2 to 32 parts by weight of a polymethylol glycoluril compound, from about 2 to 24 parts by weight of a resorcinol-formaldehyde non heat hardenable, water soluble and thermoplastic compound (a fusible novolak or novolak resin), from about 0 to 3 parts by weight of an alkaline material selected from the group consisting of $NH_4OH$, KOH and NaOH, and from about 150 to 1,100 parts by weight of water, is very useful as a treating, dipping or coating material for use in bonding glass fiber reinforcing elements to rubber compounds. Sufficient alkaline material such as aqueous $NH_3$, KOH or NaOH is added to the dispersion (or to one or more of the ingredients of the dispersion before mixing them together) to obtain the desired pH, prevent coagulation of the latex and to provide for stabilization. This will vary with the acidity of the novolak and the pH of the latex and so forth, all of which may vary from batch to batch. Since the amount of each compound may vary, the amount of alkaline material required can also vary. After drying the adhesive on the glass fiber reinforcing element to remove water and to heat cure or heat set the adhesive on the element, the adhesive containing element can then be combined or calendered with a curable rubber compound and the resulting assembly cured, usually in a mold, to provide a laminate exhibiting good adhesive properties.

The present method involves only one dipping step and the process or method can be varied to provide the desired pick-up or solids on the cord by varying the concentration of the dip or the speed of the cord through the dip to give the amount needed to develop the requisite adhesive bond. Thus, while the cord can be run through successive dips of the same or varying amounts of the above materials to get the desired buildup, this is unnecessary as satisfactory results can be accomplished in one dip. Pre or post dips of other adhesive compositions are unnecessary when using the present aqueous adhesive dip.

Another advantage in employing the glass fiber cord dip of the present invention is that the components of the dip do not need to be pre-reacted. Many of the dips are stable at high solids concentrations for extended periods of time. The dried and/or cured adhesive coated cord can exhibit high tensile strengths, and the dried and/or cured adhesive coated cord can be coated uniformly without blister, in other words, it is smooth.

DISCUSSION OF DETAILS AND PREFERRED EMBODIMENTS

The glass fiber reinforcing element or cord comprises a plurality of substantially continuous and parallel glass fibers or monofilaments. The reinforcing element or fibers contain little or no twist. In other words, twist is not intentionally applied to the element or fibers; the only twist, if any, in the element or fibers is that occassioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skim stock. The glass fiber reinforced ply stock is then ready to be used in the manufacture of a tire or for other purposes.

Glass compositions useful in making the fibers for the reinforcing element or glass tire cord are well known to the art. One of the preferred glasses to use is a glass known as E glass and described in "Mechanics of Pneumatic Tires," Clark, National Bureau of Standards Monograph 122, U.S. Dept. of Commerce, issued November, 1971, pages 241–243, 290, and 291. The number of glass filaments or fibers employed in the glass fiber reinforcing element or cord can vary considerably depending on the ultimate use or service requirements. Likewise, the number of strands of glass fibers used to make a glass fiber reinforcing element or cord can vary widely. In general, the number of filaments in the glass fiber reinforcing element or cord for a passenger car tire can vary from about 500 to 3,000 and the number of strands in the reinforcing element can vary from 1 to 10, preferably the number of strands is from 1 to 7 and the total number of filaments about 2,000. A representative industry tire cord known as G-75 (or G-75, 5/0) has 5 strands each with 408 glass filaments. Another representative cord known as G-15 has a single strand containing 2,040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxy silane, or similar aminoalkyl alkoxy silanes, which, when applied to the glass fibers, hydrolyzes and polymerizes to form a poly(aminosiloxane) in which a portion of the polymer is attached to the glass and another portion contains amine groups (having active hydrogen atoms) for reaction with components of the cord dip such as the RF resin or the polymethylol glycoluril compound. Various glass fiber sizing compounds and compositions are shown in U.S. Pat. Nos. 3,252,278; 3,287,204; and 3,538,974.

The type of rubber latex used in the tire cord dip bath of this invention is a latex of a copolymer of a vinyl pyridine and a conjugated diolefin having four to six carbon atoms. The rubber latex is of the type described in U.S. Pat. No. 2,561,215 and comprises an aqueous dispersion of a copolymer of 50 to 95 percent by weight of a conjugated diolefin having four to six carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight butadiene-1,3, about 7 to 32% styrene and about 5 to 22% of 2-vinyl pyridine. Excellent results are obtained using a latex of a terpolymer of about 70% by weight of butadiene-1,3, 15% styrene and 15% 2-vinyl pyridine having a total solids content of around 30 to 50% by weight. Also, blends of latices may be used such as a blend of a butadiene-1,3/2-vinyl pyridine rubbery copolymer latex and a butadiene-1,3/styrene rubbery copolymer latex or a blend of a butadiene-1,3/styrene/2-vinyl pyridine rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers including freeze stabilizers should be compatible to avoid coagulation on blending or mixing of the latices. The polymers from these latices have Mooney viscosities ML-4 min. at 212°F. of from about 40 to 120. Further disclosures of rubbery vinyl pyridine copolymer latices may be found in U.S. Pat. Nos. 2,615,826 and 3,437,122.

Glycoluril also known as acetyleneurea, acetylene carbamide or tetrahydroimidaz(d)imidazole-2,5-(1H,3H)-dione can be made by the reaction of glyoxal and urea in the presence of HCl. Please see "The Merck Index," Merck & Co., Inc., Rahway, N.J., 1960, page 12. In place of glyoxal there can be used methyl glyoxal, ethyl glyoxal, 1-methyl-2-ethyl glyoxal, dimethyl glyoxal or diethyl glyoxal to make alkyl derivatives of glycoluril. Mixtures of the glyoxal compounds can be employed. These compounds have the formula

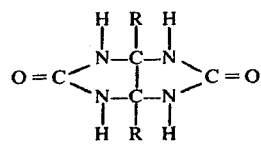

where R is hydrogen, methyl or ethyl. Examples of such compounds are glycoluril, 3-α-methyl glycoluril, 3-α-ethyl glycoluril and so forth. The glycoluril compound can then be reacted with varying amounts of formaldehyde in alkaline solution to give the polymethylol glycoluril compound. Please see the U.S. Pat. to Goodman, No. 2,697,714 (1954). See, also, U.S. Pat. to Barrett, No. 3,758,324 (1973). The resulting compounds have the formula

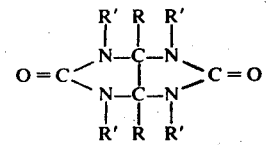

where R is hydrogen, methyl or ethyl and where R' is hydrogen or methylol, at least two of the R's being methylol. Examples of such compounds are dimethylol glycoluril, trimethylol glycoluril, tetramethylol glycoluril, dimethylol3-α-methylglycoluril, trimethylol-3-α-methylglycoluril, tetramethylol-3-α-methylglycoluril, dimethylol-3-α-ethylglycoluril, trimethylol-3-α-ethylglycoluril, tetramethylol3-α-ethylglycoluril, tetramethylol-(3-α-methyl, 3'-α'ethyl)-glycoluril, tetramethylol-(3,3',α,α'-diethyl)-glycoluril and the like and mixtures of the same. The polymethylol glycolurils should be water soluble; that is, they should be completely or substantially water soluble. Preferred compounds to use in the practice of this invention are the tetramethylolglycoluril compounds.

The water soluble, thermoplastic and non-heat hardenable (without a curing agent or crosslinker) resorcinol-formaldehyde novolak or novolak resin or mixture thereof is prepared under acid conditions by the reaction of resorcinol and formaldehyde (or a formaldehyde donor like paraformaldehyde) to provide compounds having reactive phenolic hydroxy groups rather than methylol groups. The mol ratio of resorcinol to formaldehyde can vary over a considerable range to provide novolaks useful in the practice of the present invention although a preferred mol ratio of resorcinol to formaldehyde is about 1:0.5 to 2.0. These compounds and methods for making them are well known in the art.

Examples of commercially available resorcinolformaldehyde compounds are the water soluble novolak resins known as Arofene 779 (Ashland Chemical Co.) having a mol ratio of resorcinol to formaldehyde of about 1/0.62 and a commercially available novolak resin which comprises a mixture of about 15 parts by weight of resorcinol, 42.5 parts of diresorcinol methane (R/F/R) and 42.5 parts of a low molecular weight R/F novolak resin of a R/F mol ratio of about 3/2.

Since the resorcinol-formaldehyde novolak compound is acidic or prepared under acidic conditions, it should be neutralized or sufficient base such as NH$_4$OH, KOH or NaOH added to it to prevent coagulation of the latex when the novolak is mixed with the latex. NaOH is preferred for dip viscosity stability. Even though the latex is alkaline, sufficient additional base may still be necessary to prevent such coagulation or premature coagulaton and the consequent inability to use the dip properly.

Information on the preparation of the novolaks will be found in "Encyclopedia of Chemical Technology,"

Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 30 to 31; and "Formaldehyde," Walker, A.C.S. Monograph Series, Reinhold Publishing Corp., New York, N.Y., Third Edition, 1964, pages 336 to 339.

Water is used in an amount sufficient to provide for the desired dispersion of the rubber or latex particles, for the solution of the polymethylol glycoluril compound and resorcinol-formaldehyde novolak, to obtain the desired viscosities, and for the proper solids content to get the necessary pick-up of solids on and penetration between the fibers of the cord.

Based on 100 parts by weight (dry weight) of the vinyl pyridine rubber copolymer, or blend of the same, the dip comprises the rubber, from about 2 to 32 parts by weight of the polymethylol glycoluril compound, from about 2 to 24 parts by weight of the resorcinol-formaldehyde novolak, from about 0 to 3.0 parts by weight of water soluble base such as $NH_4OH$, KOH or NaOH to provide a pH of at least 7.0, and from about 150 to 1,100 parts by weight of water.

In order to provide data for the tire cord adhesive of this invention, a standard single-cord H-pull test is employed to determine the static adhesion at room temperature and above of the adhesive-coated glass tire cord to rubber. All the data submitted herein including the working example which follows are based upon identical test conditions, and all test specimens are prepared and tested in the same way generally in accordance with ASTM Designation: D 2138-67.

To apply the latex adhesive to the glass fiber cords in a reliable manner, the cords are fed through the adhesive dip bath while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried in the oven at from about 200° to 550°F. for from about 5–300 seconds, preferably at from about 400° to 500°F. for from about 90 to 30 seconds. The time the cord remains in the one-step adhesive is about a few seconds or so or at least for a period of time sufficient to allow wetting of the cord and at least substantial total impregnation of the fibers of the cord. The drying or curing of the adhesive treated glass fiber cord may be accomplished in one or more ovens at different times and temperatures.

The single-cord H-pull test is then employed to determine the static adhesion of the dried adhesive coated glass fiber cords to rubber. In each case the rubber test specimens are made from the same standard type vulcanizable rubber composition comprising a blend of natural rubber, rubbery cis-polybutadiene and rubbery butadiene-styrene copolymer, reinforcing carbon black and the customary compounding and curing ingredients.

In every case the cords to be tested are placed in parallel positions in a multiple-strand mold of the type described in the single-cord H-pull adhesion test ASTM designated D 2138-67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has a ⅜ inch cord embedment.

After the rubber has been cured, the hot reticulate cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an INSTRON tester provided with specimen grips. The maximum force in pounds required to separate the cord from the rubber is the H-adhesion value.

Cords or fabric coated with the adhesive of the present invention using the one-step or single dip of this invention can have from about 10 to 40% by weight (dry) solids of the adhesive dip on the cord based on the weight of the cord and can be used in the manufacture of carcasses, belts, flippers and chafers of radial, bias, or belted-bias passenger tires, truck tires, motorcycle and bicycle tires, off-the-road tires and airplane tires, and, also, in making transmission belts, V-belts, conveyor belts, hose, gaskets, rubbers, tarpaulins and the like.

The following example will serve to illustrate the invention with more particularity to those skilled in the art. In this example the parts are parts by weight unless otherwise indicated.

EXAMPLE

The aqueous alkaline dip (40% by weight total solids) comprised a vinyl pyridine rubber latex (1) to which was added an aqueous solution of TM-MGU (2) and subsequently an aqueous alkaline solution of Penacolite R-2170 (3). Glass fiber cords (4) were passed through the dip and then into an 8 foot long tube in which hot air was blown in a direction opposite to the movement of the cord. The temperature where the air entered the tube was 60° to 90°F. higher than the temperature at the exit end of the tube. The highest temperature during the drying or curing of the dipped cord was about 460°F., and the time in the tube was about 45 seconds. After said drying and curing, the adhesive treated cords were laminated with the standard type rubber stock described supra, and molded, and the resulting assembly was cured for 20 minutes at 305°F. After curing, the assembly was removed from the mold, cooled and tested according to the H-adhesion test described supra. The composition of the dips and the H-adhesions and cord tensiles obtained for the cords treated as described above are shown in the Table below:

Table

PROPERTIES OF GLASS TIRE CORD WITH TM-MGU ADHESIVE

| Run No. | Resin Mixture, Ratio Parts by Weight (dry) | Resin Mixture, Total Parts by Weight (dry) per 100 Parts by Weight (dry Latex Solids |
|---|---|---|
| 1 | Penacolite/TM-MGU, 50/50 | 17 |
| 2 | Penacolite/TM-MGU, 50/50 | 17 |
| 3 | Penacolite/TM-MGU, 50/50 | 19 |
| 4 | Penacolite/TM-MGU, 47/53 | 17 |
| 5 | Penacolite/TM-MGU, 47/53 | 19 |
| 6 | Penacolite/TM-MGU, 47/53 | 19 |
| 7 | Penacolite/TM-MGU, 50/50 | 17 |
| 8 | Penacolite/TM-MGU, 50/50 | 17 (7) |
| | Controls | |
| 9 | Penacolite-$H_2CO$, 89/11 | 16 |
| 10 | Penacolite-$H_2CO$, 89/11 | 16 |
| 11 | Resorcinol/TM-MGU, 25/75 | 17 |
| 12 | Penacolite/TM-MGU, 50/50 | 17 (7) |
| 13 | Hicor 404H Control (12) | |
| 14 | 065T Control (13) | |

| Run No. | Type of Rubber Latex | DPU (8) | H-Adhesion RT (9) | 250°F. |
|---|---|---|---|---|
| 1 | Vinyl pyridine | 35.6 | 43.1 | 28.6 |
| 2 | Vinyl pyridine | 30 | 35.2 | 21.7 |
| 3 | Vinyl pyridine | 27.5 | 37.6 | 21.2 |
| 4 | Vinyl pyridine | 29.6 | 35.4 | 13.1 |
| 5 | Vinyl pyridine | 31.1 | 34.0 | 16.1 |
| 6 | 75 pbw dry vinyl pyridine 25 pbw dry SBR (5) | 35 | 39.1 | 23.9 |
| 7 | Vinyl pyridine | 33 | 38.7 | 25.5 |
| 8 | 75 pbw dry vinyl pyridine 25 pbw dry SBR | 38 | 41.6 | 26.5 |
| | Controls | | | |
| 9 | Vinyl pyridine | 30 | 36.6 | 19.1 |
| 10 | Vinyl pyridine | 34 | 37.2 | 17.5 |
| 11 | 75 pbw dry vinyl pyridine 25 pbw dry SBR | 34 | 30.7 | 16.1 |
| 12 | 75 pbw dry vinyl pyridine 25 pbw dry modified SBR (6) | 32 | 38.7 | 25.2 |
| 13 | | 30 | 35.5 | 21.4 |
| 14 | | 18 | 35.6 | 19.1 |

| Run No. | RT, Orig. | Tensile (10) After Humid. Aged (11), RT |
|---|---|---|
| 1 | 70.3 | 42.9 |
| 2 | 70 | 58.9 |
| 3 | 66.7 | 56.8 |
| 4 | 67 | 55 |
| 5 | 70 | 56 |
| 6 | 68.4 | 54 |
| 7 | 73.2 | 44.3 |
| 8 | 71.5 | 60.8 |
| | Controls | |
| 9 | 64.0 | 50.9 |
| 10 | 65.5 | 39.6 |
| 11 | 65.5 | 52.5 |
| 12 | 69.7 | 55.6 |
| 13 | — | — |
| 14 | — | — |

Notes:
(1) Aqueous alkaline (about pH 10.5 – 10.7) dispersion of a rubbery terpolymer of 70 parts by weight of butadiene-1,3, 15 parts of styrene and 15 parts of 2-vinyl pyridine, 41% by weight total solids (about 39% by weight rubber solids, balance surfactant, stabilizer etc.), Mooney viscosity ML-4 min. at 212° F.=about 40, emulsion polymerized, freeze stable.
(2) Aqueous alkaline solution of tetramethylol-3-$\alpha$-methyl glycoluril (TM-MGU) or tetra-N-hydroxymethyl-3-$\alpha$-methyl glycoluril. The TM-MGU was prepared by reacting 4 moles (324 grams of 37% formalin) of formaldehyde with 1 mole (156 grams) of 3-$\alpha$-methyl glycoluril. Aqueous potassium hydroxide was added dropwise to the mixture with stirring to raise the pH to 8. The mixture exothermed at 49°C. and was then heated with agitation to 55°C. for two hours to produce the TM-MGU compound. The resulting preparation as such was used in the above dips.
(3) Preformed aqueous resorcinol-formaldehyde novolak resin solution, Koppers Co., Inc., neutralized with sodium hydroxide solution.
(4) G-15 cord, E glass, single strand tire cord of 2040 glass filaments, Owens-Corning Fiberglas Corporation.
(5) Emulsion polymerized copolymer of butadiene-1,3 and styrene, about 44–48% by weight of bound styrene, Mooney viscosity ML-4 min. at 212°F. = about 60–90, about 41–43% total solids, hot polymerized, pH about 10.5–11.5.
(6) Emulsion polymerized copolymer of butadiene and styrene, about 60% styrene, containing copolymerized therewith a minor amount of an unsaturated acid, neutralized to a pH of about 9.1, 50% total solids.
(7) Viscosity increased after 3 days.
(8) Dip pickup. Percent by weight. Pickup determined by ignition loss.
(9) Room temperature, about 22–27°C; in pounds
(10) Test used was ASTM D 2970; in pounds
(11) After 3 days at 176°F. and high humidity.
(12) Dipped G-75, 5/0 glass fiber cord. Cord dip composition on cord was unknown. PPG Industries, Inc.
(13) Dipped G-75, 5/0 glass fiber cord. Cord dip composition on cord was unknown. Owens-Corning Fiberglas Corp.

While in the foregoing example, the adhesive containing glass fiber reinforcing elements can be adhered to a vulcanizable blend of natural rubber, rubbery cis-polybutadiene and rubbery butadiene-styrene copolymer by curing the same in combination together, it is apparent that said heat cured adhesive containing glass fiber reinforcing element can be adhered to other vulcanizable rubbery materials, by curing or vulcanizing the same in combination with the rubber, such as one of the foregoing rubbers as well as nitrile rubbers, chloroprene rubbers, polyisoprenes, polybutadienes, vinyl pyridine rubbers, acrylic rubbers, isoprene-acrylonitrile rubbers and the like and mixtures of the same. These rubbers can be mixed with the usual compounding ingredients including sulfur, stearic acid, zinc oxide, magnesium oxide, accelerators, antioxidants and other curatives, rubber compounding ingredients and the like well known to those skilled in the art for the particular rubbers being employed.

The embodiments of the invention in which an exclusive property or privilege is claimed are defined as follows:

1. A glass fiber reinforcing element containing from about 10 to 40% by weight (dry) based on the weight of said element of a heat cured adhesive composition useful for adhering said element to a rubber compound and consisting essentially of 100 parts by weight of a rubbery vinyl pyridine copolymer, from about 2 to 32 parts by weight of at least one water soluble polymethylolglycoluril compound having the formula

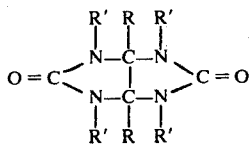

where R is hydrogen, methyl or ethyl and where R' is hydrogen or methylol, at least two of the R's being methylol, and from about 2 to 24 parts by weight of at least one water soluble, thermoplastic and non heat hardenable resorcinol-formaldehyde novolak, said composition coating and at least substantially totally impregnating said element.

2. A glass fiber reinforcing element according to claim 1 where said rubbery vinyl pyridine copolymer is a copolymer of from about 60 to 80% by weight of butadiene 1,3, from about 7 to 32% by weight of styrene, and from about 5 to 22% by weight of 2-vinyl pyridine and where said novolak is made by reacting resorcinol with formaldehyde in the mol ratio of about 1:0.5 to 2.

3. A glass fiber reinforcing element according to claim 2 where said copolymer is a blend of a terpolymer of butadiene-1,3, styrene and 2-vinyl pyridine and a copolymer of butadiene-1,3 and styrene.

4. A glass fiber reinforcing element according to claim 2 where said element is a cord of about 2, substantially parallel and continuous E glass filaments.

5. A glass fiber reinforcing element according to claim 2 where R' is methylol.

6. A glass fiber reinforcing element according to claim 2 in which said polymethylol glycoluril compound is tetramethylol-3-α-methylglycoluril.

7. A method for adhering a glass fiber reinforcing element to a rubber compound which comprises treating said element with a composition consisting essentially of an aqueous alkaline dispersion of 100 parts by weight of a rubbery vinyl pyridine copolymer, from about 2 to 32 parts by weight of at least one water soluble polymethylolglycoluril compound having the formula

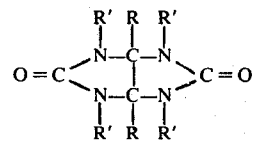

where R is hydrogen, methyl or ethyl and where R' is hydrogen or methylol, at least two of the R's being methylol, from about 2 to 24 parts by weight of at least one water soluble, thermoplastic and non heat hardenable resorcinolformaldehyde novolak, from about 0 to 3 parts by weight of an alkaline material selected from the group consisting of NH$_4$OH, KOH and NaOH, and from about 150 to 1,100 parts by weight of water, heating said treated element at a temperature and for a time sufficient to remove essentially all of the water from said composition and to provide said element with a heat cured adhesive in an amount of from about 10 to 40% by weight (dry) based on the weight of said reinforcing element, combining said dried and heat cured adhesive containing reinforcing element with an unvulcanized vulcanizable rubber compound, and vulcanizing the same, said composition coating and at least substantially totally impregnating said element.

8. A method for adhering a glass fiber reinforcing element to a rubber compound which comprises treating said element with a composition consisting essentially of an aqueous alkaline dispersion of 100 parts by weight of a rubbery vinyl pyridine copolymer, from about 2 to 32 parts by weight of at least one water soluble polymethylolglycoluril compound having the formula

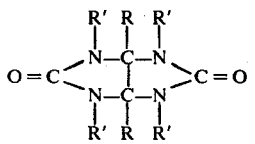

where R is hydrogen, methyl or ethyl and where R' is hydrogen or methylol, at least two of the R's being methylol, from about 2 to 24 parts by weight of at least one water soluble, thermoplastic and non heat hardenable resorcinolformaldehyde novolak, from about 0 to 3 parts by weight of an alkaline material selected from the group consisting of NH$_4$OH, KOH and NaOH, and from about 150 to 1100 parts by weight of water, heating said treated element at a temperature of from about 200° to 550°F. for from about 5 to 300 seconds to remove essentially all of the water from said composition and to provide said element with a heat cured adhesive in an amount of from about 10 to 40% by weight (dry) based on the weight of said reinforcing element, combining said dried and heat cured adhesive containing reinforcing element with an unvulcanized vulcanizable rubber compound, and vulcanizing the same, said composition coating and at least substantially totally impregnating said element.

9. A method according to claim 8 where said rubbery vinyl pyridine copolymer is a copolymer of from about 60 to 80% by weight of butadiene-1,3, from about 7 to 32% by weight of styrene, and from about 5 to 22% by weight of 2-vinyl pyridine and where said novolak is made by reacting resorcinol with formaldehyde in the mol ratio of about 1:0.5 to 2.

10. A method according to claim 9 where said copolymer is a blend of a terpolymer of butadiene-1,3, styrene and 2-vinyl pyridine and a copolymer of butadiene-1,3 and styrene.

11. A method according to claim 9 where said reinforcing element is a cord of about 2040 substantially parallel and continuous E glass filaments.

12. A method according to claim 9 where said treated element is heated at a temperature of from about 400° to 500°F. for from about 90 to 30 seconds.

13. A method according to claim 9 where R' is methylol.

14. A method according to claim 9 in which said polymethylol glycoluril compound is tetramethylol-3-α-methylglycoluril.

15. The product produced by the method of claim 7.

16. The product according to claim 15 in which the reinforcing element is a cord of about 2040 substantially parallel and continuous E glass filaments.

17. A bonded composite material comprising a glass fiber reinforcing element embedded in a vulcanized rubber, said element containing from about 10 to 40% by weight (dry) based on the weight of said element of a heat cured adhesive composition consisting essentially of 100 parts by weight of a rubbery vinyl pyridine copolymer, from about 2 to 32 parts by weight of at least one water soluble polymethylolglycoluril compound having the formula

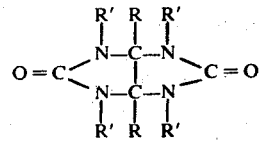

where R is hydrogen, methyl or ethyl and where R' is hydrogen or methylol, at least two of the R's being methylol, and from about 2 to 24 parts by weight of at least one water soluble thermoplastic and non heat hardenable resorcinol-formaldehyde novolak and said composition forming a bond between said element and said rubber, said composition coating and at least substantially totally inpregnating said element.

18. A bonded composite material according to claim 17 where said rubbery vinyl pyridine copolymer is a copolymer of from about 60 to 80% by weight of butadiene-1,3, from about 7 to 32% by weight of styrene, and from about 5 to 22% by weight of 2-vinyl pyridine and where said novolak is made by reacting resorcinol with formaldehyde in the mol ratio of about 1:0.5 to 2.

19. A bonded composite material according to claim 18 where said copolymer is a blend of a terpolymer of butadiene-1,3, styrene and 2-vinyl pyridine and a copolymer of butadiene-1,3 and styrene.

20. A bonded composite material according to claim 18 where said element is a cord of about 2040 substantially parallel and continuous E glass filaments.

21. A bonded composite material according to claim 18 where R' is methylol.

22. A bonded composite material according to claim 18 in which said polymethylol glycoluril compound is tetramethylol-3-α-methylglycoluril.

* * * * *

UNITED STATES PATENT OFFICE
CERTIFICATE OF CORRECTION

PATENT NO. : 3,895,163
DATED : July 15, 1975
INVENTOR(S) : Otto C. Elmer

It is certified that error appears in the above-identified patent and that said Letters Patent are hereby corrected as shown below:

Col. 9, Claim 4, Line 63 which reads: "2,' "

should read ---2040---

Signed and Sealed this sixteenth Day of September 1975

[SEAL]

Attest:

RUTH C. MASON
Attesting Officer

C. MARSHALL DANN
Commissioner of Patents and Trademarks